March 31, 1959  F. W. WILCOX  2,879,902
COMBINATION TRAILER AND HOIST
Filed Feb. 17, 1956  2 Sheets-Sheet 1
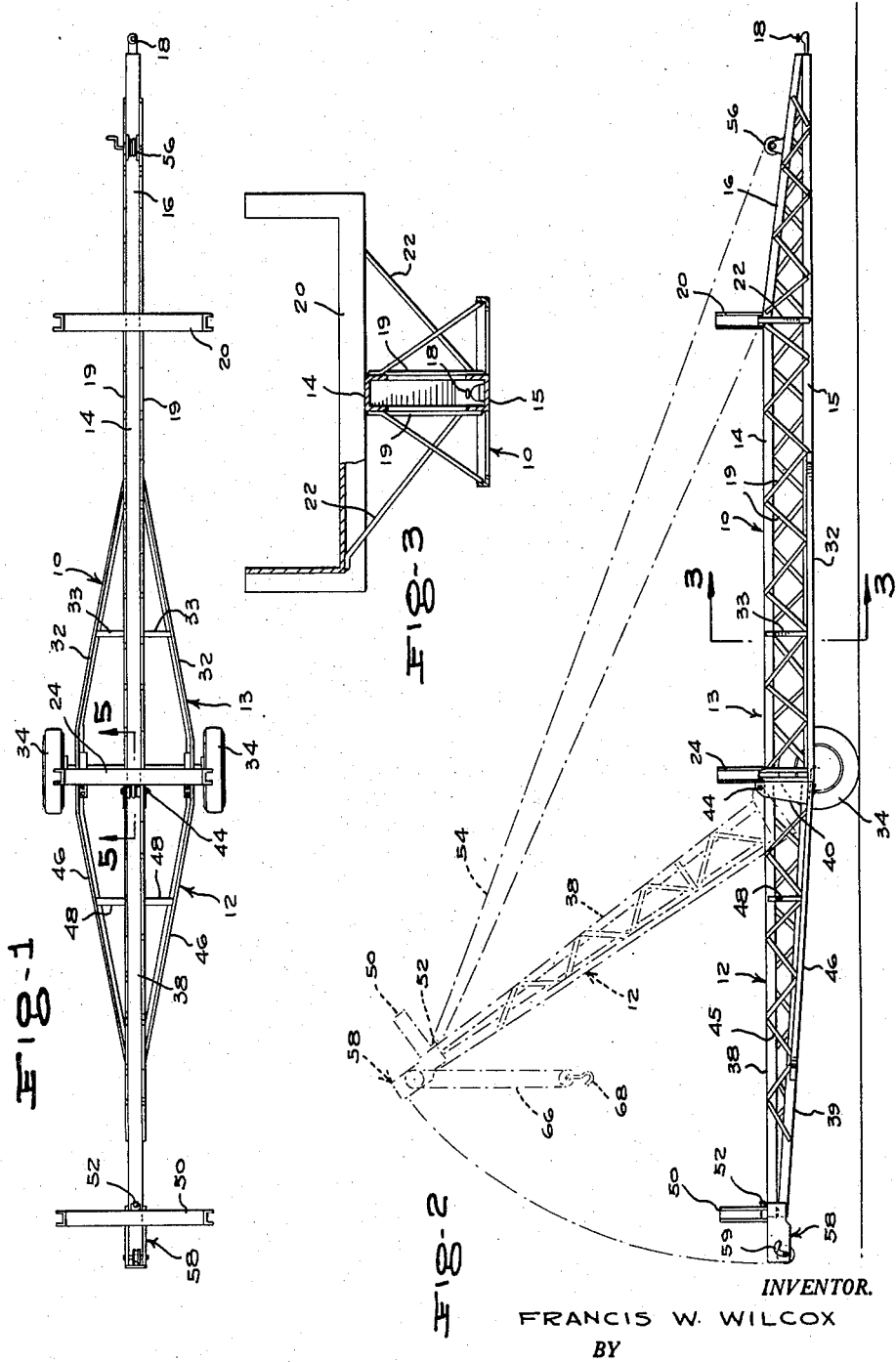
INVENTOR.
FRANCIS W. WILCOX
BY
McMorrow, Berman + Davidson
ATTORNEYS March 31, 1959  F. W. WILCOX  2,879,902
COMBINATION TRAILER AND HOIST
Filed Feb. 17, 1956  2 Sheets-Sheet 2
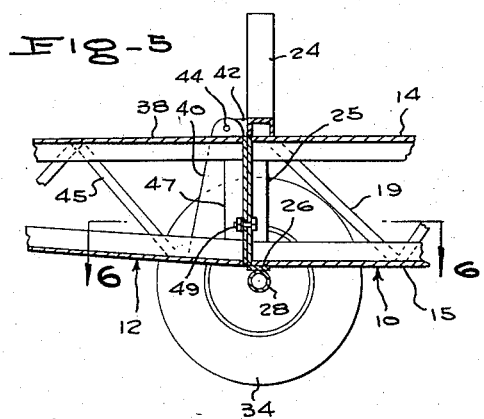
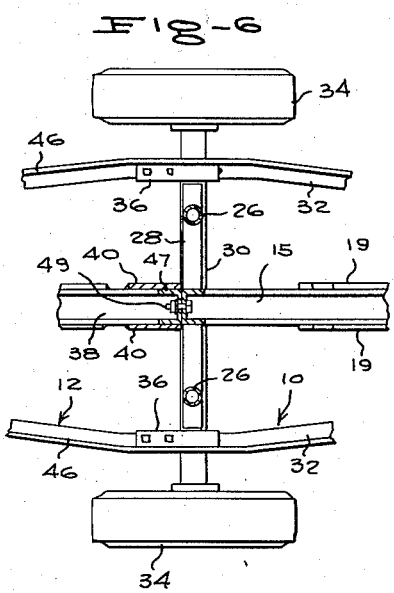
INVENTOR.
FRANCIS W. WILCOX
BY
McMorrow, Berman & Davidson
ATTORNEYS

United States Patent Office 2,879,902
Patented Mar. 31, 1959

2,879,902

COMBINATION TRAILER AND HOIST

Francis W. Wilcox, Eugene, Oreg.

Application February 17, 1956, Serial No. 566,210

1 Claim. (Cl. 212—8)

Summarized briefly, the present invention is a trailer for hauling irrigation pipe, logs, etc., the trailer having an elongated, wheeled frame adapted to be drawn by a traction vehicle. The frame includes hingedly connected sections, one of the sections being a main section and having means at its front end to hitch the same to the traction vehicle, said main section at its rear end being provided with a pair of ground wheels. The trailing section of the vehicle is hingedly connected to the rear end of the leading or main section, for swinging movement in a vertical plane, between a first position in which said trailing section is extended horizontally as a rearwardly projecting extension of the main section, and a second position in which the trailing section is swung upwardly to provide a boom.

In the first position of the trailing section, the two sections, which are equipped with longitudinally spaced bunks aligning horizontally in this relative position of the sections, cooperate in providing a rollable support for elongated members such as irrigation pipes, logs, lengths of structural steel, etc.

On the free or rear end of the trailing section there is provided a sheave means, which, when the trailing section is elevated to provide a boom, is adapted to be operated for the purpose of elevating or lowering any of various objects the hoisting of which is required.

The broad object of the present invention is to provide a structure of the type referred to which can be used as an all purpose trailer and hoist, that is, the structure can be employed at times for the purpose of hauling elongated lengths of material, and at other times as a hoist or crane. In this way, the material, after being transported to its destination, can be lifted and moved about through the use of the elevated trailing frame section and its associated sheave. Alternatively, an all purpose hoist can be said to be provided by the apparatus, since the hoist, independently of any characteristic of the structure for hauling said long length of material, can be employed for lifting or lowering heavy motors, farm implements, etc.

A further object of importance is to provide a trailer of the type referred to which, though being usable at different times either as a carrier for elongated lengths of material or as a hoist, can still be manufactured at little or no increase in cost above that required for a conventional trailer of the same length and load-carrying characteristics.

Still another object of importance is to provide a combination trailer and hoist of the type referred to which, whether in use as a carrier or as a hoist, will be possessed of exceptionally great ruggedness, will have a particularly accurate balance and will be of substantial strength despite its relative lightness and simplified design.

Still another object is to provide a vehicle of the nature described that can be readily knocked down for shipping, so as to occupy a relatively small amount of space under the circumstances.

Other objects will appear from the following description, the claim appended thereto, and from the annexed drawing, in which like reference characters designate like parts throughout the several views, and wherein:

Figure 1 is a top plan view of a combination trailer and hoist formed according to the present invention;

Figure 2 is a side elevational view, the rear section being shown in full lines in lowered position for use of the apparatus as a material carrier, and in dotted lines in raised position for use of the apparatus as a crane or hoist;

Figure 3 is an enlarged transverse sectional view substantially on line 3—3 of Figure 2;

Figure 4 is an exploded, fragmentary, enlarged perspective view showing the front and rear sections at the location of their connection to one another;

Figure 5 is a longitudinal sectional view, on an enlarged scale, taken on line 5—5 of Figure 1;

Figure 6 is a plan sectional view on line 6—6 of Figure 5, on the same scale as Figure 5; and Figure 7 is a fragmentary perspective view of the rear end of the rear section.

Referring to the drawings in detail, the vehicle constituting the present invention comprises two main parts, namely a front frame section 10, and a rear frame section 12. Together these constitute a frame, chassis, or support generally designated at 13 adapted to be drawn by a traction vehicle, not shown.

Considering first the construction of the main or forward frame section 10, this is formed as an elongated, horizontally extending, truss-like assembly including vertically spaced, horizontally disposed, confronting channel members 14, 15. The channel member 15 is straight from end to end thereof, and at its forward end, channel member 14 is integrally formed or otherwise made rigid with an extension 16 inclined slightly from the vertical, and disposed in forwardly converging relation to the lower channel member 15. Secured to the front end of the channel member 15 is a hitch 18, whereby the apparatus can be attached to a traction vehicle.

Welded or otherwise fixedly secured to the side walls of the respective channel members 14, 15 are inclined brace bars 19. At each side of the assembly, the brace bars are arranged in a zig-zag relationship, that is, in a series of V-shaped braces. The V-shaped braces at one side of the assembly are staggered longitudinally of the assembly relative to the V-shaped braces at the other side, as best shown in Figure 2.

A U-shaped front bunk 20 is disposed transversely of the longitudinally and centrally extending frame member defined by the channel members 14, 15, and as shown in Figure 3 is supported, medially between the opposite ends of the bight part thereof, upon the channel member 14. The bunk 20 is welded or otherwise fixedly secured where it crosses the plane of the frame member, and bracing the connection are upwardly divergent braces 22, connected between the lower channel member 15 and the end portions of the bight part of the bunk.

As shown, the bunk is made of channel material, faced outwardly of the bunk in the illustrated, preferred embodiment of the invention.

An intermediate bunk 24 is formed identically to the forward bunk 20 (see Figure 4) and is fixedly secured to the rear end of the frame member, said rear end of the frame member including a vertically extending frame portion 25 fixedly connected between the rear extremities of channel members 14, 15. Spaced outwardly from opposite sides of frame portion 25 and aligned transversely of the frame portion 25 are vertical braces 26, formed of heavy pipe material or the like, these being fixedly connected between the bunk 24 and the ends of a horizontally disposed, transveresly extending plate 28 that is fixedly secured intermediate its ends to the rear extremity of channel member 15.

Welded or otherwise fixedly connected to the underside of the plate 28 is an axle housing or sleeve 30 through which extends an axle 31. Referring now to Figures 1, 4, and 6, fixedly connected at their rear ends to the ends of the axle sleeve 30 are longitudinally extending, side brace bars 32, converging forwardly from the axle sleeve and fixedly joined at their forward ends to the channel member 15. Transversely bracing the brace bars 32 and the longitudinally and centrally extending frame member are cross braces 33, 33 (Figure 1).

Ground wheels 34 are carried by the ends of the axle 31 to support the frame for rollable movement.

Welded to the rear ends of brace bars 32, and projecting rearwardly from the axle sleeve 30 at a slight inclination from the horizontal, are tongues 36 each of which has longitudinally spaced openings formed therein for a purpose to be made presently apparent.

The rear frame section 12 is formed similarly to the front frame section, including upper and lower, confronting channel members 38, 39. These are disposed in a common vertical plane, and as shown in Figure 2, converge in a rearward direction. At their divergent, forward ends, the channel members 38, 39 are fixedly connected to a connecting frame portion, and secured fixedly to opposite sides of said frame portion are plates 40, 40 (Figure 4), receivable between rearwardly projecting, apertured hinge plates 42, 42 of the front frame section 10.

Extending through registering apertures of the plates 40 and the hinge plates 42 is a hinge pin 44.

At their opposite sides, the channel members 38, 39 are braced similarly to the front frame section by means of inclined brace members 45.

At its opposite sides, the rear frame section 12 has rearwardly converging, longitudinal brace bars 46 (Figure 1), fixedly connected at their convergent ends to the lower channel member 39. Cross brace members 48 are fixedly connected between the intermediate portions of brace bars 46 and the upper channel member 38.

By reason of the construction illustrated, it is seen that the rear frame section is hingedly connected to the front frame section, for swinging movement about a horizontal axis extending transversely of the front section. Since the hinge axis is disposed at the upper ends of the frame portions 25, 47 of the front and rear frame sections respectively, said frame portions provide abutments engaging one another in the manner shown in Figure 5 to limit downward swinging movement of the rear frame section beyond the full line, horizontal position thereof shown in Figure 2.

When the rear frame section is swung downwardly in this manner, a connecting bolt 49 is extended through registering openings formed in the connecting frame portion, to lock the rear frame section in its downwardly swung position, rigidly to the front frame section. Further rigidifying the connection of the sections in this relationship are bolts extending through the tongues 36 and the divergent ends of the longitudinal brace bars 46 of the rear frame section.

It is thus seen that when the rear frame section is swung downwardly for use of the apparatus as a trailer or carrier, not only are the longitudinally and centrally extending frame members of the respective sections rigidly connected directly to one another through the medium of the bolt 49 cooperating with the hinge pin 44, but also, they are braced against any tendency of the rear frame section to whip horizontally through the direct connections extending between the tongues 36 and the forwardly diverging brace bars 46.

Adjacent the rear end of the section 12, there is provided a bunk 50 aligned longitudinally of the apparatus (when the section 12 is lowered) with bunks 24, 20. Bunk 50 is identical to the bunks previously described, and is fixedly secured to the channel member 38.

Mounted upon the bunk 50, directly above the channel member 38, is a sheave or pulley 52, and adapted to be trained about said pulley 52 is a cable 54, one end of which is connected to the front frame section at the location of the bunk 20, and the other end of which is coiled upon the drum of a hand or motor driven winch 56.

It will be noted that the winch 56 is below the level of the bight portions of the several bunks, so that when the elongated lengths of material, such as irrigation pipe or the like, are being transported and are supported upon the bunks, they will not contact the winch.

Rearwardly of the bunk 50, there is mounted upon the section 12 a sheave or pulley assembly generally designated at 58. This has been shown to particular advantage in Figure 7, and includes a pulley the shaft of which seats in upwardly arched or angular slots 59, formed in pulley support plates 60 welded to and projecting rearwardly from the convergent ends of the channel members 38, 39.

When the shaft 62 of pulley 64 is in one end of the slots 59 the uppermost portion of the pulley is disposed below the load supporting surface of bunk 50, so that the load cannot contact the pulley. However, the other ends of the slots 59 are at a higher elevation, and accordingly, when the pulley 64 is to be used, the shaft 62 thereof is shifted to said other ends of the slots 59. The pulley is now in an upwardly adjusted position, ready for use.

In use of the trailer, and assuming that one is transporting a plurality of elongated lengths of irrigation pipe, lengths of structural steel, logs, etc., the trailing section 12 is lowered and locked to the front section in the manner previously described. There is now provided an elongated, rollable frame comprising a horizontally extending, truss-like assembly composed of frame members 14, 15, 38, and 39. Said assembly is supported intermediate its ends by the ground wheel 34, and is provided with horizontally aligned, U-shaped bunks 20, 24, 50 on which the materials being carried are supported. Since two of the bunks are upon the leading frame section, which is supported at its opposite ends by the ground wheels and by the traction vehicle, the main weight of the load is assumed by the leading section. However, the weight imposed upon the trailing frame section is still fully supported, in view of the braced, rigid connection of said trailing section to the leading section. Any tendency of the trailing section to swing downwardly is counteracted by the abutting ends of the respective frame sections, with said ends being in contact below the hinge axis of the rear frame section 12.

If it is desired to use the apparatus as a hoist, one merely removes the bolt 49 and the bolts of the tongues 36. This frees the rear frame section for upward swinging movement, and by operation of the wings 56, said rear frame section can be swung upwardly so as to now constitute a boom.

The apparatus can now be used for the lifting of various objects, and to this end, a cable 66 is trained about pulley 64, and has at its lower end a load support hook 68. The cable 66 can be remotely controlled through the medium of a suitable winch, for raising and lowering the supported objects.

The construction further adapts the apparatus for being knocked down for shipment. The two frame sections can be wholly separated from one another, and the bunks can be left detached, to be welded to the associated frame sections at the destination point.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

A combination trailer and hoist including an elongated front frame section, said front section including a plurality of upwardly opening, U-shaped bunks spaced longitudinally thereof; means at the front end of said section for hitching the same to a traction vehicle; ground wheels at the rear end of the front section for supporting the same for rolling movement upon the ground surface; a rear frame section having a hinged connection to the front section, the axis of said connection extending horizontally, transversely of the respective sections to permit swinging movement of the rear section within a vertical plane, said rear section being swingable between a first position in which it is aligned longitudinally with the front section to cooperate therewith in providing an elongated, rollable, load support frame, the rear section including at least one U-shaped bunk alignable longitudinally of the sections, in said position of the rear frame section, with the bunks of the front section, to cooperate therewith in supporting elongated objects being carried, each of the several bunks having a bight part affixed intermediate its ends to the section supporting the same, the bight part of each bunk extending perpendicularly to the length of and projecting laterally outwardly beyond the respective sides of its associated supporting section; side brace bars having forward ends fixedly secured to the front frame section, the side brace bars diverging toward their rear ends; other side brace bars having rear ends fixedly secured to the rear frame section, the second named side brace bars diverging toward their forward ends, the divergent ends of the several side brace bars being spaced laterally outwardly from the frame sections; and means separably, fixedly connecting the divergent ends of the first named side brace bars to the corresponding divergent ends of the second named side brace bars, said axis of the hinged connection being disposed in close proximity to the top surfaces of the respective frame sections in said first position of the rear section, the hingedly connected ends of the respective sections having end surfaces in full face-to-face contact extending vertically downwardly from said axis of the hinged connection, the separable, fixed connections of the first and second side brace bars being spaced laterally outwardly from the lower ends of the abutting end surfaces of the respective frame sections and being disposed in a common horizontal plane in which the lower ends of the face-to-face contacting, abutting end surfaces of the respective frame sections substantially terminate.

References Cited in the file of this patent

UNITED STATES PATENTS

| | | |
|---|---|---|
| 1,113,408 | Burlingame | Oct. 13, 1914 |
| 2,190,300 | Zeeland | Feb. 13, 1940 |
| 2,574,646 | LeTourneau | Nov. 13, 1951 |
| 2,662,655 | Sellers | Dec. 15, 1953 |
| 2,733,823 | Evans | Feb. 7, 1956 |